United States Patent
Xue et al.

(10) Patent No.: US 9,926,459 B2
(45) Date of Patent: Mar. 27, 2018

(54) ENERGY SAVING SELF-CLEANING ROOF PAINT

(71) Applicant: BEHR PROCESS CORPORATION, Santa Ana, CA (US)

(72) Inventors: Chenchen Xue, Irvine, CA (US); Ming-Ren Tarng, Irvine, CA (US)

(73) Assignee: Behr Process Corporation, Santa Ana, CA (US)

( * ) Notice: Subject to any disclaimer, the term of this patent is extended or adjusted under 35 U.S.C. 154(b) by 82 days.

(21) Appl. No.: 15/158,751

(22) Filed: May 19, 2016

(65) Prior Publication Data
US 2017/0335128 A1 Nov. 23, 2017

(51) Int. Cl.
*C08K 3/22* (2006.01)
*C09D 133/08* (2006.01)
*C09D 5/16* (2006.01)

(52) U.S. Cl.
CPC .......... *C09D 133/08* (2013.01); *C09D 5/1606* (2013.01); *C08K 2003/2241* (2013.01); *C08K 2201/005* (2013.01); *C08K 2201/006* (2013.01); *C08K 2201/014* (2013.01); *C09D 5/1618* (2013.01)

(58) Field of Classification Search
CPC ................. C08K 2003/2241; C08K 2201/006
See application file for complete search history.

(56) References Cited

U.S. PATENT DOCUMENTS

| | | | |
|---|---|---|---|
| 6,048,910 A * | 4/2000 | Furuya | B01J 35/004 427/515 |
| 6,680,135 B2 | 1/2004 | Boire et al. | |
| 7,955,430 B2 * | 6/2011 | Grochal | C04B 41/4558 106/401 |
| 8,138,261 B2 | 3/2012 | Matsuzawa et al. | |
| 8,258,206 B2 | 9/2012 | Kanagasabapathy et al. | |
| 8,372,774 B2 | 2/2013 | Kitazaki et al. | |
| 8,475,581 B2 | 7/2013 | Stratton et al. | |
| 8,524,325 B2 * | 9/2013 | Takahashi | C09D 5/1625 427/384 |
| 2012/0118318 A1 | 5/2012 | Dyrup | |
| 2015/0072136 A1 | 3/2015 | MacLaughlin et al. | |

* cited by examiner

*Primary Examiner* — Richard A Huhn
(74) *Attorney, Agent, or Firm* — Brooks Kushman P.C.

(57) ABSTRACT

A paint composition for forming energy saving self-cleaning coatings includes water, a binder composition, a powder catalyst composition, a first pigment composition, a second pigment composition, and a fluoropolymer-composition. The binder composition includes a first acrylic resin having an average particle size from about 0.2 to 1 micron and a glass transition temperature less than about 10° C. The powder catalyst composition includes anatase titanium dioxide with a surface area from about 50 to 500 m²/g. It should be appreciated that anatase provides catalyst activity that is useful for providing the self-cleaning properties of the present embodiment. The first pigment composition includes rutile titanium dioxide which typically has low or no catalytic activity while the second pigment composition is different than the first pigment composition. Characteristically, the fluoropolymer-containing composition includes polyvinylidene fluoride and a second acrylic resin.

18 Claims, No Drawings

ENERGY SAVING SELF-CLEANING ROOF PAINT

TECHNICAL FIELD

In at least one aspect, the present invention is related to paint compositions for forming energy saving self-cleaning coatings, and in particular, paint coatings that are applied to a roof.

BACKGROUND

Paint coatings are ubiquitous finding numerous applications for both aesthetic and functional applications. In many applications, paint coating are applied to improve the aesthetic appeal of a surface by providing a uniform and pleasing appearance. In additional to the visual effects, paint coating can also improve the energy management properties of a surface by rejecting infrared radiation. Such energy management is particularly useful with respect to the external surfaces of a building or dwelling.

In this regard, it is known that the white color of the roof paint provide most energy savings in summer by the reflecting of solar rays. The current roof paints in the market are typically compounded with relative low Tg of soft polymer that can be even softer when the environment is hot. Moreover, the soft polymers used in these formulations can physically embed dirt picked up on the surface making these surfaces impossible to thoroughly clean. This causes the white roof paint can turn to gray color in a short period time while reducing solar reflectivity. The reduction in solar reflectivity diminishes the benefit of the white color for energy saving.

Accordingly, there is a need for paint compositions that product coating with improved energy savings while not degrading after extended environmental exposure.

SUMMARY

The present invention solves one or more problems of the prior art by providing a paint composition for forming energy saving self-cleaning coatings. The paint composition includes water, a binder composition, a powder catalyst composition, a first pigment composition, a second pigment composition, and a fluoropolymer-composition. The binder composition includes a first acrylic resin having an average particle size from about 0.2 to 1 micron and a glass transition temperature less than about 10° C. The powder catalyst composition includes anatase titanium dioxide with a surface area from about 50 to 500 $m^2/g$. It should be appreciated that anatase provides catalyst activity that is useful for providing the self-cleaning properties of the present embodiment. The first pigment composition that includes rutile titanium dioxide which typically has low or no catalytic activity while the second pigment composition is different than the first pigment composition. Characteristically, the fluoropolymer-containing composition includes polyvinylidene fluoride and a second acrylic resin.

In another embodiment, a paint composition for forming energy saving self-cleaning coatings is provided. The paint composition includes a binder composition present in an amount from about 5 to 35 weight percent, the binder composition including acrylic resin having an average particle size from about 0.2 to 1 micron and a glass transition temperature less than about 10° C., a powder catalyst composition present in an amount from about 1 to 10 weight percent, a first pigment composition that includes rutile titanium dioxide present in an amount from about 5 to 20 weight percent, a second pigment composition that is different than the first pigment composition present in an mount from about 5 to 25 weight percent, a fluoropolymer-containing composition is present in an amount from about 5 to 25 weight percent, and balance water. Characteristically, the powder catalyst composition includes anatase titanium dioxide with a surface area from about 50 to 500 $m^2/g$.

Advantageously, the paint compositions of the invention provide surface coatings with low contamination causes by dirt after extended environmental exposure. Moreover, the coatings exhibit lower surface temperatures than coating formed from many prior art paint compositions.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

In an embodiment, a paint composition that is useful for self-cleaning coating applications is provided. The paint composition includes water, a binder composition, a powder catalyst composition, a first pigment composition, a second pigment composition, and a fluoropolymer-composition. The binder composition includes a first acrylic resin having an average particle size from about 0.2 to 1 micron and a glass transition temperature less than about 10° C. In a refinement, the first acrylic resin has a weight average molecular weight from about 700,000 to 1,300,00. The powder catalyst composition includes anatase titanium dioxide with a surface area from about 50 to 500 $m^2/g$. It should be appreciated that anatase provides catalyst activity that is useful for providing the self-cleaning properties of the present embodiment. The first pigment composition that includes rutile titanium dioxide which typically has low or no catalytic activity while the second pigment composition is different than the first pigment composition. Characteristically, the fluoropolymer-containing composition includes polyvinylidene fluoride and a second acrylic resin. In a refinement, the second acrylic resin has a weight average molecular weight from about 300,000 to 700,000 and the polyvinylidene fluoride has a weight average molecular weight from about 700,000 to 1,300,000. Advantageously the paint composition of the present embodiment can be applied to a surface such as a roof to provide energy resistant while resisting marring by exposure to the elements.

The first acrylic resin and the second acrylic resin can be the same or different with respect to chemical composition and/or particle size. In a variation, the first acrylic resin and second acrylic resin are independently formed by one or more monomers selected from the group consisting of methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, bis-(1,1,1,3,3,3-hexafluoroisopropyl), 1H,1H,3H-hexafluorobutyl acrylate, 1H,1H, 7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H,1H,5H-octafluoropentyl acrylate, 1H,1H,3H-tetrafluoropropyl methacrylate, hexafluoro-iso-propyl, 1H,1H,3H-hexafluorobutyl methacrylate, 1H,1H,5H-octafluoropentyl methacrylate, and combinations thereof.

The binder composition and the fluoropolymer-containing composition used in the paint composition are characterized by its glass transition temperature. Glass transition temperature can be determined from ASTM E1356-08(2014) *Standard Test Method for Assignment of the Glass Transition Temperatures by Differential Scanning Calorimetry*; the entire disclosure of which is hereby incorporated by reference. In a variation, the binder composition has a glass transition temperature less than about 0° C. In some refinements, the binder composition has a glass transition temperature less than or equal to, in increasing order of preference, 20° C., 10° C., 5° C., 0° C., −5° C., or −10° C. In further refinements, the binder composition has a glass transition temperature greater than or equal to, in increasing order of preference −60° C., −50° C., −40° C., −30° C., −25° C., −20° C. In one particular refinement, the binder composition has a glass transition temperature from about −40° C. to about 0° C. In another particular refinement, the fluoropolymer-containing composition has a glass transition temperature less than about 20° C. In some refinements, the fluoropolymer-containing composition has a glass transition temperature less than, in increasing order of preference, 50° C., 40° C., 20° C., 10° C., 5° C., or 0° C. In further refinements, the fluoropolymer-containing composition has a glass transition temperature greater than or equal to, in increasing order of preference, −30° C., −20° C., −10° C., −5° C., 0° C., 5° C. In one particular refinement, the fluoropolymer-containing composition has a glass transition temperature from about 0° C. to about 20° C.

As set forth above, the binder composition includes a first acrylic resin having an average particle size from about 0.2 to 1 micron. In a variation, the binder composition includes a first acrylic resin having an average particle size less than, in increasing order of preference, 1 micron, 0.8 microns, 0.6 microns, 0.4 microns, 0.3 microns, or 0.2 microns. In some refinements, the binder composition includes a first acrylic resin having an average particle size great than or equal to, in increasing order of preference, 0.6 microns, 0.5 microns, 0.4 microns, 0.3 microns, 0.2 microns, or 0.1 microns.

In a variation, the fluoropolymer-containing composition includes polyvinylidene fluoride particles and acrylic resin particles each independently having an average particle size from about 0.1 to about 0.6 microns. In certain refinements, the fluoropolymer-containing composition includes polyvinylidene fluoride particles and acrylic resin particles each independently having an average particle size great than or equal to, in increasing order of preference, 0.05 microns, 0.07 microns, 0.1 microns, 0.2 microns, or 0.3 microns. In further refinements, the fluoropolymer-containing composition includes polyvinylidene fluoride particles and acrylic resin particles each independently having an average particle size less than or equal to, in increasing order of preference, 1 micron, 0.8 microns, 0.6 microns, 0.5 microns, or 0.4 microns.

One skilled in the art of paint formulation will recognize that various proportions of the paint composition will provide self-cleaning paint coating when applied to a substrate such as a roof. In a variation, the binder composition is present in an amount greater than or equal to, in increasing order of preference, 3 weight percent, 5 weight percent, 8 weight percent, 10 weight percent, or 15 weight percent and less than or equal to 40 weight percent, 35 weight percent, 30 weight percent, 25 weight percent, or 20 weight percent. In a further variation, the first pigment composition is present in an amount greater than or equal to, in increasing order of preference, 3 weight percent, 5 weight percent, 8 weight percent, 10 weight percent, or 15 weight percent and less than or equal to 40 weight percent, 35 weight percent, 30 weight percent, 25 weight percent, or 20 weight percent. In another further variation, the second pigment composition is present in an amount greater than or equal to, in increasing order of preference, 3 weight percent, 5 weight percent, 8 weight percent, 10 weight percent, or 15 weight percent and less than or equal to 40 weight percent, 35 weight percent, 30 weight percent, 25 weight percent, or 20 weight percent. In still another further variation, the fluoropolymer-containing is present in an amount greater than or equal to, in increasing order of preference, 3 weight percent, 5 weight percent, 8 weight percent, 10 weight percent, or 15 weight percent and less than or equal to 40 weight percent, 35 weight percent, 30 weight percent, 25 weight percent, or 20 weight percent. In each of these compositions, the balance is water. In one refinement, the binder composition is present in an amount from about 5 to 35 weight percent, the powder catalyst composition is present in an amount from about 1 to 10 weight percent, the first pigment composition is present in an amount from about 5 to 20 weight percent, the second pigment composition is present in an amount from about 5 to 25 weight percent, the fluoropolymer-containing composition is present in an amount from about 5 to 25 weight percent, and balance water.

In typical applications, the paint composition can include one or more additives in relatively low amounts in order to provide important properties to the paint composition. Typical additives include rheology modifiers, surfactants, defoamers, organic solvents, pH adjusters, dispersants, coalescents, and biocides. In a variation, the additives are collectively present in an amount from about 1 to 10 weight percent. In a refinement, the additives are collectively present in an amount from about 1 to 5 weight percent. It should be appreciated that other well-known additives can be utilized to provide additional properties.

The following examples illustrate the various embodiments of the present invention. Those skilled in the art will recognize many variations that are within the spirit of the present invention and scope of the claims.

Table 1 provides a self-cleaning composition to be applied to a surface. When this composition is applied to a commercial paint surface and exposure to environmental conditions for 6 month the self-cleaning paint surface is found to haves less dirt than the surface of commercial paint surface. Moreover, the self-cleaning paint surface has a surface temperature that is 2-5° C. lower compared to the surface of a commercial paint surface.

TABLE 1

Self-cleaning paint composition
Formula for Energy Saving

| Material | Weight | Description |
| --- | --- | --- |
| Deformer | 5 | mixture of mineral oil, polysiloxane (silicone oils) |
| Dispersant | 10 | Hydrophobic Copolymer Polyelectrolyte |
| Surfactant | 2.5 | neutralized (potassium salt) form of an ethoxylated aliphatic alcohol phosphate ester |
| pH adjuster | 1.5 | Ammonia |
| Solvent | 18 | Ethylene Glycol |
| Pigment | 300 | Nepheline syenite, Silica, sodium potassium alumina silicate |
| TiO2 Slurry | 150 | TiO2 |
| Biocide | 9 | a broad-spectrum, water-based product that is effective against a wide variety of fungal and algal organisms |
| Photocatalyst Pigment | 60 | Photocatlayst TiO2 |
| Water | 75 | |
| Rheology Modifier | 3 | Hydrophobically modified alkali-soluble anionic polymer |
| Biocide | 3 | microbiostat preservative |
| Elastomeric Polymer | 330 | acrylic binder for elastomeric roof and wall coating |
| Fluoro-polymer | 200 | hybrid dispersion containing, on polymer solids, 50% by weight Kynar ® PVDF resin, and 50% proprietary acrylic resin |
| Total | 1167 | |

While exemplary are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A paint composition comprising:
water;
a binder composition including first acrylic resin having an average particle size from about 0.2 to 1 micron and a glass transition temperature less than about 10° C.;
a powder catalyst composition including anatase titanium dioxide with a surface area from about 50 to 500 m$^2$/g;
a first pigment composition that includes rutile titanium dioxide;
a second pigment composition that is different than the first pigment composition; and
a fluoropolymer-containing composition including polyvinylidene fluoride and a second acrylic resin, the second acrylic resin being the same or different than the first acrylic resin.
2. The paint composition of claim 1 wherein the fluoropolymer-containing composition includes polyvinylidene fluoride particles and acrylic resin particles each independently having an average particle size from about 0.1 to about 0.6 microns.
3. The paint composition of claim 1 wherein the first acrylic resin is formed by one or more monomers selected from the group consisting of methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, 1H,1H,2H,2H -heptadecafluorodecyl methacrylate, 1H,1H,2H,2H-heptadecafluo rodecyl acrylate, 1H,1H,5H-octafluo ropentyl acrylate, 1H,1H,3H-tetrafluo- ropropyl methacrylate, 1H,1H,3H-hexafluorobutyl methacrylate, 1H,1H,5H-octafluoropentyl methacrylate, and combinations thereof.

4. The paint composition of claim 1 wherein
the binder composition is present in an amount from about 5 to 35 weight percent;
the powder catalyst composition is present in an amount from about 1 to 10 weight percent;
the first pigment composition is present in an amount from about 5 to 20 weight percent;
the second pigment composition is present in an amount from about 5 to 25 weight percent;
the fluoropolymer-containing composition is present in an amount from about 5 to 25 weight percent; and
the balance is water.

5. The paint composition of claim 1 further comprising an additive selected form the group consisting of rheology modifiers, surfactants, defoamers, organic solvents, pH adjusters, dispersants, coalescents, and biocides.

6. The paint composition of claim 5 wherein the additive is present in an amount from about 1 to 10 weight percent.

7. The paint composition of claim 1 wherein the binder composition has a glass transition temperature less than about 0° C.

8. The paint composition of claim 1 wherein the binder composition has a glass transition temperature from about −40° C. to about 0° C.

9. The paint composition of claim 1 wherein the fluoropolymer-containing composition has a glass transition temperature less than about 20° C.

10. The paint composition of claim 1 wherein the fluoropolymer-containing composition has a glass transition temperature from about 0° C. to about 20° C.

11. A paint composition comprising:
a binder composition present in an amount from about 5 to 35 weight percent, the binder composition including a first acrylic resin having an average particle size from about 0.2 to 1 micron and a glass transition temperature less than about 10° C.;
a powder catalyst composition present in an amount from about 1 to 10 weight percent, the powder catalyst composition including anatase titanium dioxide with a surface area from about 50 to 500 mm$^2$/g;
a first pigment composition that includes rutile titanium dioxide present in an amount from about 5 to 20 weight percent;
a second pigment composition that is different than the first pigment composition present in an amount from about 5 to 25 weight percent;
a fluoropolymer-containing composition present in an amount from about 5 to 25 weight percent; and
balance water.

12. The paint composition of claim 11 wherein the fluoropolymer-containing composition includes polyvinylidene fluoride particles and acrylic resin particles each independently having an average particle size from about 0.1 to about 0.6 microns.

13. The paint composition of claim 11 wherein the first acrylic resin is formed by one or more monomers selected from the group consisting of methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, 1H, 1H,2H,2H-heptadecafluorodecyl methacrylate, 1H,1H,2H,2H-heptadecafluorodecyl acrylate, 1H,1H,5H-octafluoropentyl acrylate, 1H,1H,3H-tetrafluoropropyl methacrylate, 1H,1H,3H-hexafluorobutyl methacrylate, 1H,1H,5H-octafluoropentyl methacrylate, and combinations thereof.

14. The paint composition of claim 11 further conprising an additive selected for the group consisting of rheology modifiers, surfactants, defoamers, organic solvents, pH adjusters, dispersants, coalescents, and biocides.

15. The paint composition of claim 14 wherein the additive is present in an amount from about 1 to 10 weight percent.

16. The paint composition of claim 11 wherein the binder composition has a glass transition temperature from about −40° C. to about 0° C.

17. The paint composition of claim 11 wherein the fluoropolymer-containing composition has a glass transition temperature less than about 20° C.

18. The paint composition of claim 11 wherein the fluoropolymer-containing composition has a glass transition temperature from about 0° C. to about 20° C.

* * * * *